US012760874B2

(12) United States Patent
Lin

(10) Patent No.: US 12,760,874 B2
(45) Date of Patent: Oct. 13, 2026

(54) DECORATIVE TREE LAMP WITH DETACHABLE ELECTRICAL CONNECTION TO BASE

(71) Applicant: Fangfang Lin, Zhejiang Province (CN)

(72) Inventor: Fangfang Lin, Zhejiang Province (CN)

( * ) Notice: Subject to any disclaimer, the term of this patent is extended or adjusted under 35 U.S.C. 154(b) by 0 days.

(21) Appl. No.: 18/667,507

(22) Filed: May 17, 2024

(65) Prior Publication Data

US 2025/0334254 A1 Oct. 30, 2025

(30) Foreign Application Priority Data

Apr. 26, 2024 (CN) ......................... 202420883413.8

(51) Int. Cl.

| | |
|---|---|
| ***F21V 21/06*** | (2006.01) |
| ***F21V 23/02*** | (2006.01) |
| ***F21V 23/04*** | (2006.01) |
| ***F21V 23/06*** | (2006.01) |
| ***F21V 33/00*** | (2006.01) |

(52) U.S. Cl.

CPC ............ *F21V 21/06* (2013.01); *F21V 23/023* (2013.01); *F21V 23/04* (2013.01); *F21V 23/06* (2013.01); *F21V 33/0028* (2013.01)

(58) Field of Classification Search

CPC .. H01R 13/052; H01R 13/0815; H01R 13/17; H01R 13/207; H01R 33/20–225; F21S 8/032; F21S 6/002; A47G 2033/0827; A47G 2033/122; A47G 33/06; A41G 1/004; A41G 1/005; F21V 21/06; F21V 19/0055; F21W 2121/04; F16B 37/085; F16B 33/02

See application file for complete search history.

(56) References Cited

U.S. PATENT DOCUMENTS

| | | | | |
|---|---|---|---|---|
| 6,030,670 | A * | 2/2000 | Chang | A41G 1/005 362/123 |
| 9,894,950 | B1 * | 2/2018 | Borslien | A41G 1/005 |
| 11,732,845 | B1 * | 8/2023 | Xu | H01R 33/94 362/382 |
| 11,744,392 | B1 | 9/2023 | Richards | |
| 11,793,342 | B1 * | 10/2023 | Hall | A47G 33/06 |
| 2009/0052168 | A1 * | 2/2009 | Chen | F21V 3/02 362/237 |

(Continued)

FOREIGN PATENT DOCUMENTS

| | | | | |
|---|---|---|---|---|
| WO | WO-9626661 A1 * | 9/1996 | | A47G 33/06 |

*Primary Examiner* — Abdulmajeed Aziz
*Assistant Examiner* — Steven Y Horikoshi

(57) ABSTRACT

Provided in the present application is a decorative tree lamp. The decorative tree lamp includes: a lamp housing, a light-emitting body, and a base. The lamp housing is configured to have a tree shape, an accommodating cavity is formed inside the lamp housing, a mounting part is formed at a lower end of the lamp housing, and electric contacts are also arranged at the lower end of the lamp housing; the light-emitting body is arranged in the accommodating cavity, and the light-emitting body is electrically connected to the electric contacts; a power supply unit is arranged inside the base, a mounting groove is formed in a top surface of the based, conductive structures are arranged in the mounting groove, and the conductive structures are electrically connected to the power supply unit; and the mounting part is mounted at the mounting groove in a detachable manner.

5 Claims, 13 Drawing Sheets

(56) References Cited

U.S. PATENT DOCUMENTS

| | | | | |
|---|---|---|---|---|
| 2013/0121787 | A1* | 5/2013 | Gaw | F16B 33/02 411/413 |
| 2016/0079701 | A1* | 3/2016 | Liao | F21V 23/06 439/39 |
| 2017/0051880 | A1* | 2/2017 | Joye | F21V 23/02 |
| 2018/0128455 | A1* | 5/2018 | Tang | F21V 19/006 |
| 2019/0120443 | A1* | 4/2019 | Xia | F21S 6/002 |
| 2022/0282860 | A1* | 9/2022 | Sonneman | F21S 4/28 |
| 2024/0018984 | A1 | 1/2024 | Chiang | |

* cited by examiner

DECORATIVE TREE LAMP WITH DETACHABLE ELECTRICAL CONNECTION TO BASE

CROSS-REFERENCE TO RELATED APPLICATION

The present application claims priority to Chinese Patent Application No. 202420883413.8, filed on Apr. 26, 2024, the entire contents of which are incorporated herein by reference.

TECHNICAL FIELD

The present application relates to the technical field of decorative lamps, and in particular to a decorative tree lamp.

BACKGROUND

A decorative tree lamp is a decorative lamp that imitates the shape of a tree, which not only can provide illumination, but also has a strong ornamental value. Therefore, the decorative tree lamp can be widely applied to various scenarios, such as squares, courtyards, hotel lobbies, living rooms or bedrooms.

The decorative tree lamp in the related art includes a lamp housing on the upper part and a base at the bottom. Due to the constraint of wires, it is difficult to completely separate the lamp housing and the base at the bottom. When the base is required to be repaired separately, it will be more inconvenient.

SUMMARY

The present application provides a decorative tree lamp, thereby improving the convenience when the base is separately maintained.

The specific technical solutions are as follows:

Embodiments of the present application provide a decorative tree lamp. The decorative tree lamp includes: a lamp housing, a light-emitting body and a base. The lamp housing is configured to have a tree shape, an accommodating cavity is formed inside the lamp housing, a mounting part is formed at a lower end of the lamp housing, and an electric contact is also arranged at the lower end of the lamp housing; the light-emitting body is arranged in the accommodating cavity, and the light-emitting body is electrically connected to the electric contact; a power supply unit is arranged inside the base, a mounting groove is formed in a top surface of the based, a conductive structure is arranged in the mounting groove, and the conductive structure is electrically connected to the power supply unit; and the mounting part is mounted at the mounting groove in a detachable manner. In a case that the mounting part is mounted at the mounting groove, the electric contact is in contact with the conductive structure.

According to the decorative tree lamp provided by the embodiments of the present application, a mounting part is formed at the lower end of the lamp housing, a mounting groove is formed in the top surface of the base, and the mounting part is mounted at the mounting groove in a detachable manner, so that the lamp housing can be separated from the base. Furthermore, conductive structures are arranged in the mounting groove, the conductive structures are electrically connected to the power supply unit, electric contacts are arranged at the lower end of the lamp housing, and the electric contacts are electrically connected to a light-emitting body located inside the lamp housing. In a case that the mounting part is mounted at the mounting groove, the electric contacts are in contact with the conductive structures, so that when the lamp housing is connected to the base, electric conduction between the light-emitting body and the power supply unit is realized through the electric contacts and the conductive structures, and the power supply unit can provide electric energy for the light-emitting body. When the lamp housing is separated from the base, the electric contacts are also separated from the conductive structures, so that the lamp housing and the base can be completely separated and are not constrained. Therefore, the convenience when the base is separately maintained can be improved.

In some embodiments, the mounting part is of a columnar structure, the mounting groove is a round groove, and the mounting part can be connected to the base in a manner of rotating relative to the mounting groove.

The lamp housing and the base can be connected and disconnected by rotating the mounting part relative to the base. The mounting and disassembling processes are easy to operate, and are time-saving and labor-saving.

In some embodiments, an external thread is formed on a side wall of the mounting part; and an internal thread is formed on an inner wall of the mounting groove, and the internal thread is matched with the external thread, so that the mounting part can be connected to the base in a threaded matching manner.

The connecting process of the lamp housing and the base is as follows: the mounting part is in contact with the mounting groove, the lamp housing is rotated, the lamp housing drives the mounting part to rotate, and the mounting part and the mounting groove are firmly connected together under the cooperation of the external thread and the internal thread. When it is necessary to separate the lamp housing from the base, it is only necessary to rotate the lamp housing in an opposite direction, and the mounting part will be loosened relative to the mounting groove.

In some embodiments, the electric contacts are arranged at the bottom of the mounting part, the number of the electric contacts is two, and the distances from the two electric contacts to the center of the columnar structure are not equal; the conductive structures include a first conductive sheet and a second conductive sheet, the first conductive sheet and the second conductive sheet are located on a bottom wall of the mounting groove, and the first conductive sheet and the second conductive sheet are configured to be in contact with different electric contacts; and the first conductive sheet is a round conductive sheet, the second conductive sheet is an annular conductive sheet and surrounds the first conductive sheet, and a gap is formed between the first conductive sheet and the second conductive sheet.

The number of the electric contacts is two, and the two electric contacts are respectively configured to be in contact with the first conductive sheet and the second conductive sheet. In this way, compared with the manner of arranging only one electric contact, it is beneficial to reduce the impedance, so that the energy consumption of the decorative tree lamp can be reduced. In addition, the distances from the two electric contacts to the center of the columnar structure are not equal, and the first conductive sheet and the second conductive sheet are respectively a round conductive sheet and an annular conductive sheet. In this way, during the rotation of the mounting part relative to the mounting groove, the electric contacts and the corresponding conductive sheets still can face up and down without being staggered. In this way, the contact relationship between the electric contacts and the corresponding conductive sheets will not be affected by the rotation angle of the mounting part.

In some embodiments, one of the two electric contacts is located at the center of the columnar structure, and the other one of the two electric contacts deviates from the center of the columnar structure; or the two electric contacts deviate from the center of the columnar structure.

In some embodiments, the mounting part is of a sleeve structure; and an inserting-connection column is arranged in the mounting groove, and the sleeve structure can be inserted into the mounting groove and sleeved on the inserting-connection column.

The mounting part is connected to the base in an inserting connection manner. Compared with the rotary connection manner of the mounting part, the inserting connection manner is simpler in operation, thereby improving the assembling or disassembling efficiency of the lamp housing and the base.

In some embodiments, the electric contacts are arranged inside the sleeve structure; and the inserting-connection column is of a hollow structure, the conductive structure is located inside the inserting-connection column, through holes are formed in an upper surface of the inserting-connection column, and the electric contacts can be inserted into the through hole and be in contact with the conductive structure.

In a case that the mounting part is mounted at the mounting groove, the electric contacts can be in contact with the conductive structures, so that the electric conduction between the power supply unit and the light-emitting body can be realized.

In some embodiments, the conductive structures are of cylindrical structures, upper ends of the cylindrical structures are connected to a top wall of the inserting-connection column, and the electric contacts can extend into the cylindrical structures and be in contact with the cylindrical structures. In a case that the electric contacts are inserted into the through holes, parts of the electric contacts extending into the inserting-connection column will enter the cylindrical structures and be in contact with the inner walls of the cylindrical structures. This contact mode can make the electric contacts and the conductive structures have a relatively large area, thereby ensuring the stability of electric conductors between the electric contacts and the conductive structures.

In some embodiments, the number of the electric contacts is two, the number of the conductive structures is two, the number of the through holes is two, and the two electric contacts can be inserted into the corresponding through holes respectively and be in contact with the corresponding conductive structures.

The number of the electric contacts is two, and the two electric contacts are respectively configured to be in contact with the corresponding conductive structures. In this way, compared with the manner of arranging only one electric contact, it is beneficial to reduce the impedance, so that the energy consumption of the decorative tree lamp can be reduced.

In some embodiments, an inner wall surface of the sleeve structure includes at least one first plane part, an outer wall surface of the inserting-connection column includes at least one second plane part, the number of second plane parts is equal to that of first plane parts, and the second plane part is configured to be in contact with the first plane part so as to limit the rotation of the sleeve structure relative to the inserting-connection column.

In this way, on one hand, when the sleeve structure is sleeved at the inserting-connection column, it is beneficial to rapidly find the angle that makes the electric contacts be aligned with the through holes; and on the other hand, after the sleeve structure is connected to the inserting-connection column, damage to the electric contacts caused by the rotation of the sleeve structure relative to the inserting-connection column can be avoided.

In some embodiments, an outer wall surface of the sleeve structure includes at least one third plane part, an inner wall surface of the mounting groove includes at least one fourth plane part, the number of fourth plane parts is equal to that of third plane parts, and the fourth plane part is configured to be in contact with the third plane part so as to limit the rotation of the sleeve structure relative to the mounting groove.

In this way, on one hand, when the sleeve structure is inserted into the mounting groove, it is beneficial to rapidly find the angle that makes the electric contacts be aligned with the through holes; and on the other hand, after the sleeve structure is inserted into the mounting groove, damage to the electric contacts caused by the rotation of the sleeve structure relative to the mounting groove can be avoided.

In some embodiments, the power supply unit includes a battery and a circuit board, and the conductive structures and the battery are electrically connected to the circuit board.

In some embodiments the decorative tree lamp further includes a control switch, the control switch is electrically connected to the circuit board, and the control switch is connected to a circuit where the conductive structures and the battery are located so as to control the on or off of the circuit.

In some embodiments, the base includes an upper housing and a lower cover plate, the lower cover plate is connected to the upper housing in a detachable manner, the upper housing and the lower cover plate jointly define a mounting cavity, and the power supply unit is located in the mounting cavity.

Figure 1:
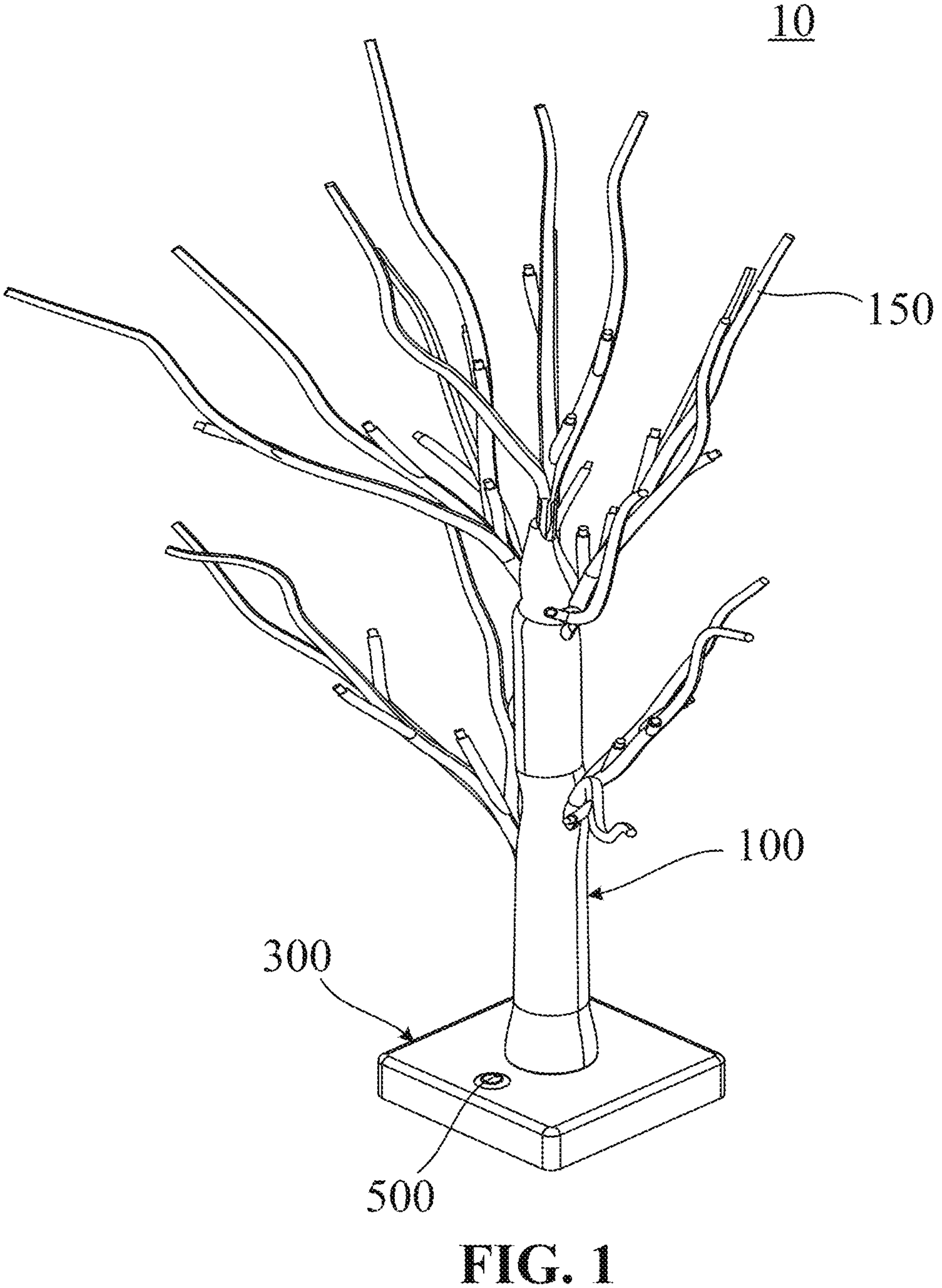
FIG. 1 is a structural schematic diagram of a decorative tree lamp according to an embodiment of the present application.
Figure 2:
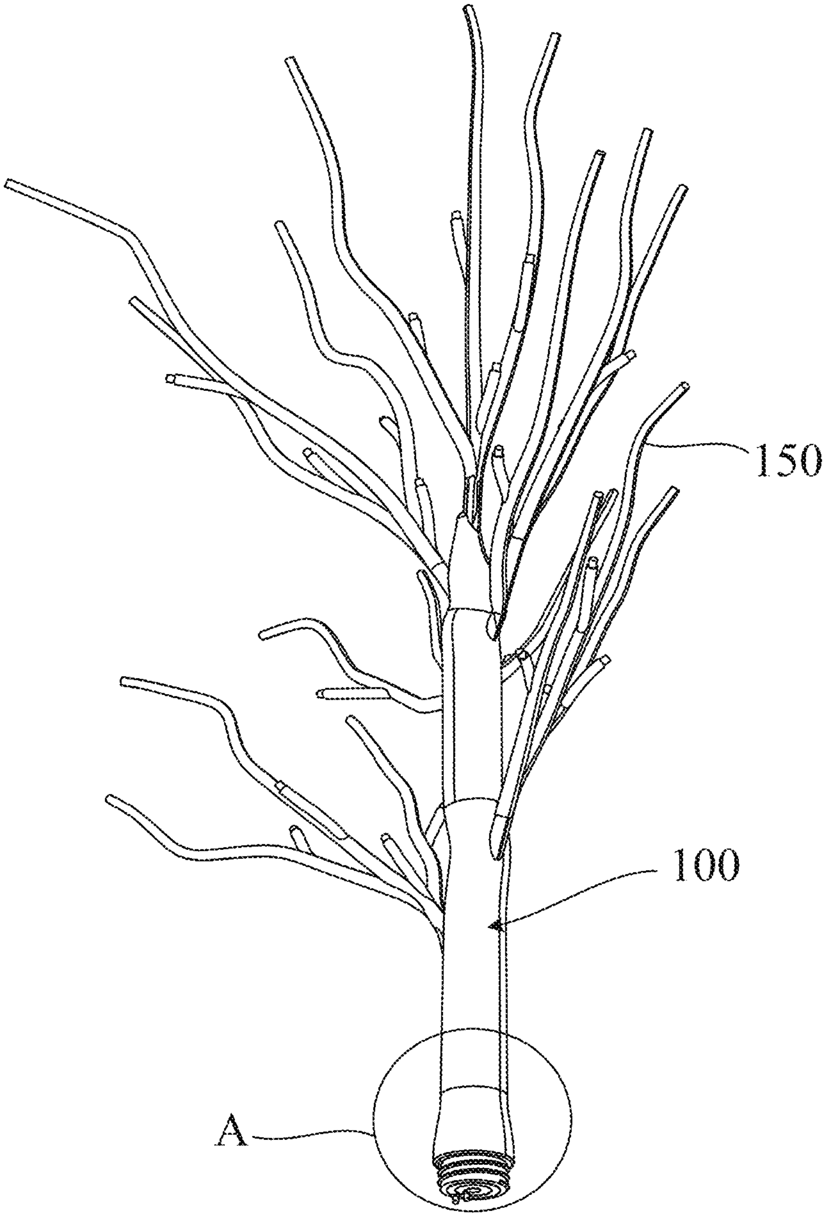
FIG. 2 is a structural schematic diagram of a lamp housing according to an embodiment of the present application.

The description of the reference numerals is as follows:

10. decorative tree lamp;

100. lamp housing; 102. first housing; 103. second housing; 110. mounting part; 110*a*. columnar structure; 110*b*. sleeve structure; 1101. external thread; 1104. first plane part; 1105. third plane part; 120. electric contact; 150. artificial branch;

200. light-emitting body;

300. base; 301. mounting groove; 3011. internal thread; 3014. inserting-connection column; 3015. through hole; 3016. second plane part; 3017. fourth plane part;

310. conductive structure; 311. first conductive sheet; 312. second conductive sheet; 314. cylindrical structure;

320. upper housing; 330. lower cover plate;

400. power supply unit; 410. battery. 420. circuit board;

500. control switch;

600. wire.

DETAILED DESCRIPTION OF EMBODIMENTS

To make the objectives, technical solutions, and advantages of the present application clearer, the present application is further described below in detail with reference to the accompanying drawings and embodiments. It should be understood that the specific embodiments described herein are only for explaining the present application, rather than for limiting the present application.

In the description of the present application, it should be understood that an azimuth or position relationship indicated by terms "upper", "lower", "left", "right" and the like is an azimuth or position relationship based on the accompanying drawings, which is only for facilitating description of the present application and simplifying description, but not indicates or implies that the referred device or element necessarily have a specific azimuth and perform construction and operation in the specific azimuth; therefore, the terms describing the position relationship in the accompanying drawings are only for exemplary description, but cannot be interpreted as a limitation to the patent. Those of ordinary skill in the art can understand the specific meanings of the above terms according to the specific situations.

In addition, the terms "first" and "second" are used merely for description, and cannot be construed as indicating or implying relative importance or implicitly indicating a quantity of indicated technical features. Thus, features defined with "first" and "second" may explicitly or implicitly include one or a plurality of features. In the description of the present disclosure, "a plurality "means at least two, for example, two, three, or the like, unless otherwise specifically defined.

In the description of the present application, unless otherwise clearly specified and limited, the terms "mounting", "connected", "connection", "fixation" and the like are intended to be understood in a broad sense. For example, the "connection" may be a fixed connection, removable connection or integral connection; may be a mechanical connection or electrical connection; may be a direct connection or indirect connection using a medium; and may be a communication or interaction between two elements, unless otherwise explicitly limited. For those of ordinary skill in the art, the specific meaning of the terms in the present application may be understood according to specific situations.

It should be noted that when an element is referred to as being "fixed" or "arranged" on another element, the element may be directly arranged on another element or a central element may be present. When an element is expressed as "connected to" another element, it may be directly connected to another element, or there may be an intermediate element at the same time. The terms "vertical", "horizontal", "upper", "lower", "left", and "right" and similar expressions used herein are for illustrative purposes only, and do not represent the only implementation manner.

As mentioned in the background, a decorative tree lamp in the related art includes a lamp housing on the upper part and a base at the bottom. An LED lamp is arranged in the lamp housing, a power supply unit is arranged in the base, and the LED lamp is electrically connected to the power supply unit through a wire. Therefore, it is difficult to completely separate the lamp housing on the upper part from the base at the bottom. Even if the lamp housing and the base are separated, the lamp housing and the base are constrained by the wire. In this way, when the base is required to be repaired separately, it will be more inconveniently.

Based on this, embodiments of the present application provide a decorative tree lamp, thereby improving the convenience when the base is separately maintained.

As shown in FIG. 1 to FIG. 6, the decorative tree lamp 10 in the embodiments of the present application includes a lamp housing 100, a light-emitting body 200 and a base 300; the lamp housing 100 is configured to have a tree shape; an accommodating cavity is formed inside the lamp housing 100; a mounting part 110 is formed at a lower end of the lamp housing 100; and electric contacts 120 are also arranged at the lower end of the lamp housing 100. The light-emitting body 200 is arranged in the accommodating cavity, and the light-emitting body 200 is electrically connected to the electric contacts 120. A power supply unit 400 is arranged inside the base 300, a mounting groove 301 is formed in the top surface of the base 300, conductive structures 310 are arranged in the mounting groove 301, and the conductive structures 310 are electrically connected to the power supply unit 400. The mounting part 110 is mounted at the mounting groove 301 in a detachable manner. In a case that the mounting part 110 is mounted at the mounting groove 301, the electric contacts 120 are in contact with the conductive structures 310.

Figure 7:
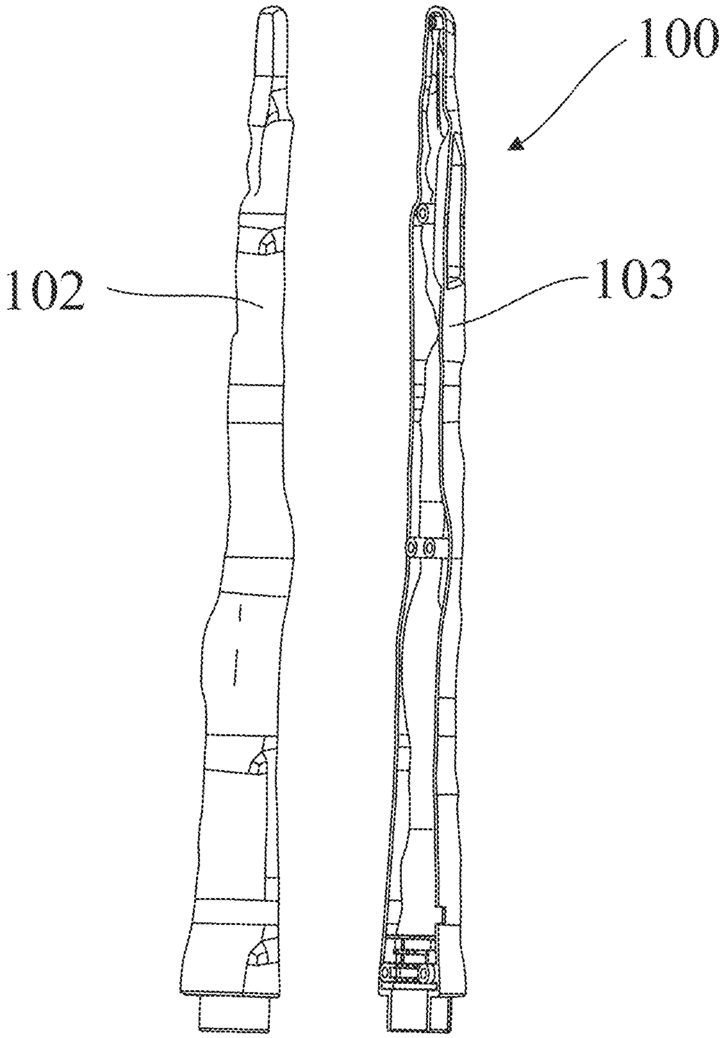
FIG. 7 is an exploded schematic diagram of a lamp housing according to an embodiment of the present application (artificial branches are omitted)
Figure 8:
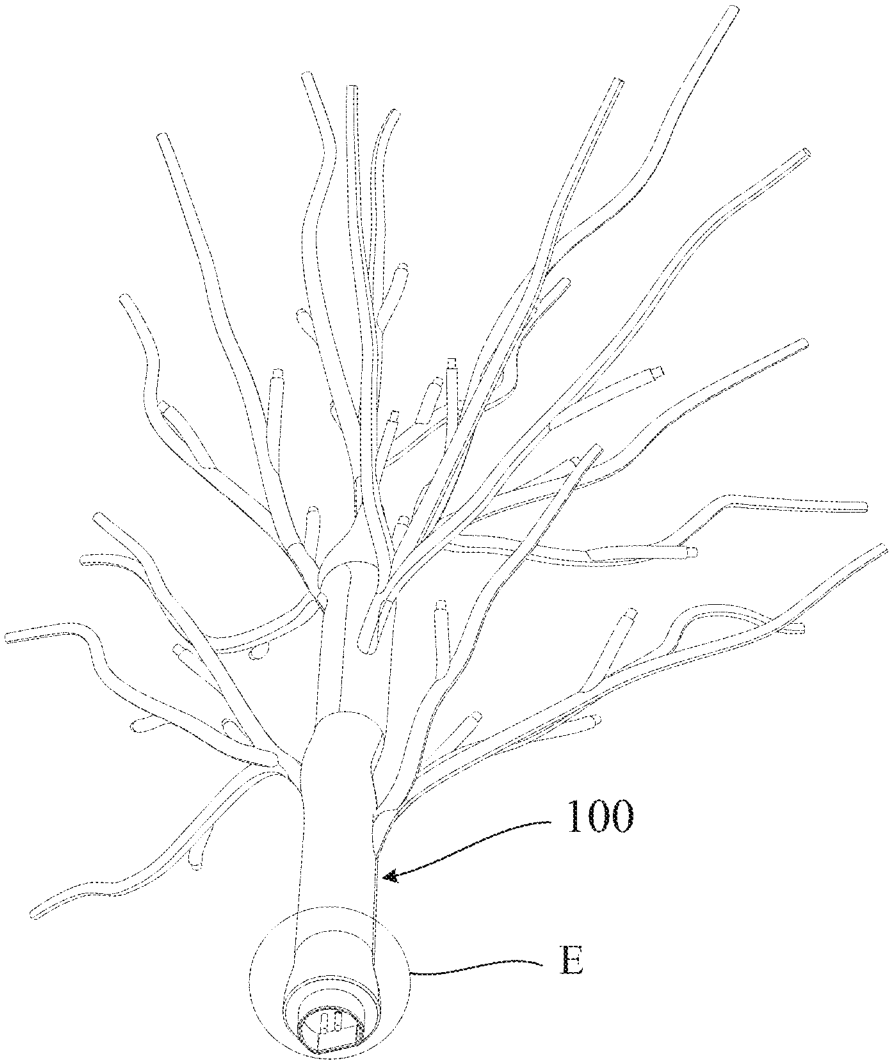
FIG. 8 is a structural schematic diagram of a lamp housing according to another embodiment of the present application.

Specifically, the lamp housing 100 may be made of a resin material, for example, thermosetting resin, so that the lamp housing 100 has good hardness and good high-temperature resistance, and will not melt by heating. A plurality of artificial branches 150 may be arranged on the lamp housing 100, so that the lamp housing 100 resembles a tree in shape. Referring to FIG. 7, the lamp housing 100 may include a first housing 102 and a second housing 103 which are connected mutually; the first housing 102 and the second housing 103 may be formed, respectively; and before the first housing 102 and the second housing 103 are connected, the light-emitting body 200 may be assembled with the first housing 102 or the second housing 103, and then the first housing

102 and the second housing 103 are connected together through screw connection, glue adhesion and the like.

The light-emitting body 200 is an object that can emit light when being energized, for example, an incandescent lamp, an LED lamp and the like. The light-emitting body 200 may be electrically connected to the electric contacts 120.

The conductive structures 310 are made of conductors. For the sake of cost, the conductors may select common metal conductors, such as copper, aluminum and nickel. The power supply unit 400 is configured to provide electric energy for the light-emitting body 200. Exemplarily, referring to FIG. 6, the power supply unit 400 may include a battery 410 and a circuit board 420. The conductive structures 310 and the battery 410 are electrically connected to the circuit board 420, or the power supply unit 400 is a power board with a power cord.

According to the decorative tree lamp 10 in the embodiments of the present application, a mounting part 110 is formed at the lower end of the lamp housing 100, a mounting groove 301 is formed in the top surface of the base 300, and the mounting part 110 is mounted at the mounting groove 301 in a detachable manner, so that the lamp housing 100 can be separated from the base 300. Furthermore, conductive structures 310 are arranged in the mounting groove 301, the conductive structures 310 are electrically connected to the power supply unit 400, electric contacts 120 are arranged at the lower end of the lamp housing 100, and the electric contacts 120 are electrically connected to a light-emitting body 200 located inside the lamp housing 100. In a case that the mounting part 110 is mounted at the mounting groove 301, the electric contacts 120 are in contact with the conductive structures 310, so that when the lamp housing 100 is connected to the base 300, electric conduction between the light-emitting body 200 and the power supply unit 400 is realized through the electric contacts 120 and the conductive structures 310, and the power supply unit 400 can provide electric energy for the light-emitting body 200. When the lamp housing 100 is separated from the base 300, the electric contacts 120 are also separated from the conductive structures 310, so that the lamp housing 100 and the base 300 can be completely separated and are not constrained. Therefore, the convenience when the base 300 is separately maintained can be improved.

In some embodiments, as shown in FIG. 2, FIG. 3, FIG. 4 and FIG. 5, the mounting part 110 is of a columnar structure 110*a*, the mounting groove 301 is a round groove, and the mounting part 110 can be connected to the base 300 in a manner of rotating relative to the mounting groove 301. It may be understood that the disassembling manner of the mounting part 110 and the base 300 is also to make the mounting part 110 rotate relative to the mounting groove 301. The lamp housing 100 and the base 300 can be connected and disconnected by rotating the mounting part 110 relative to the base 300. The mounting and disassembling processes are easy to operate, and are time-saving and labor-saving.

Figure 3:
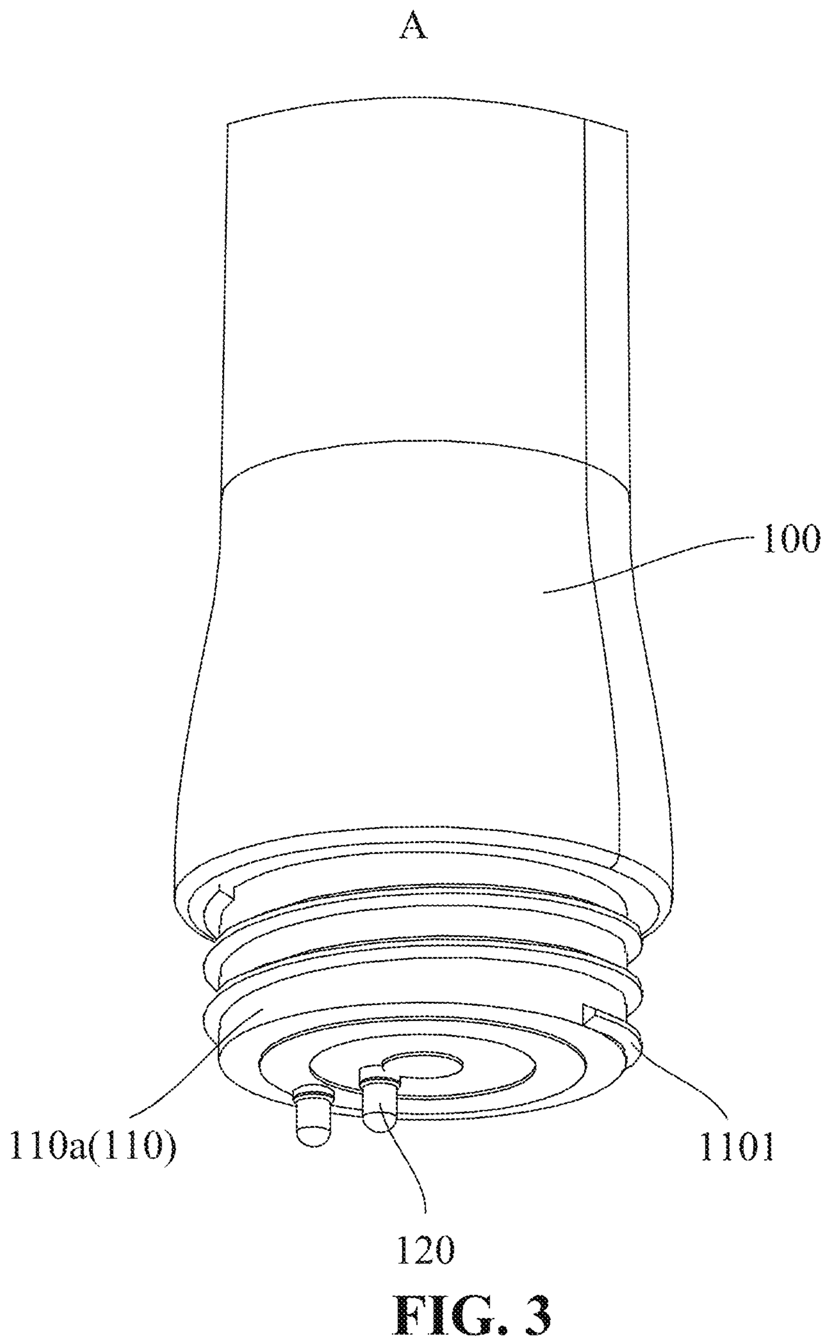
FIG. 3 is an enlarged schematic diagram of a part A in FIG. 2.
Figure 5:
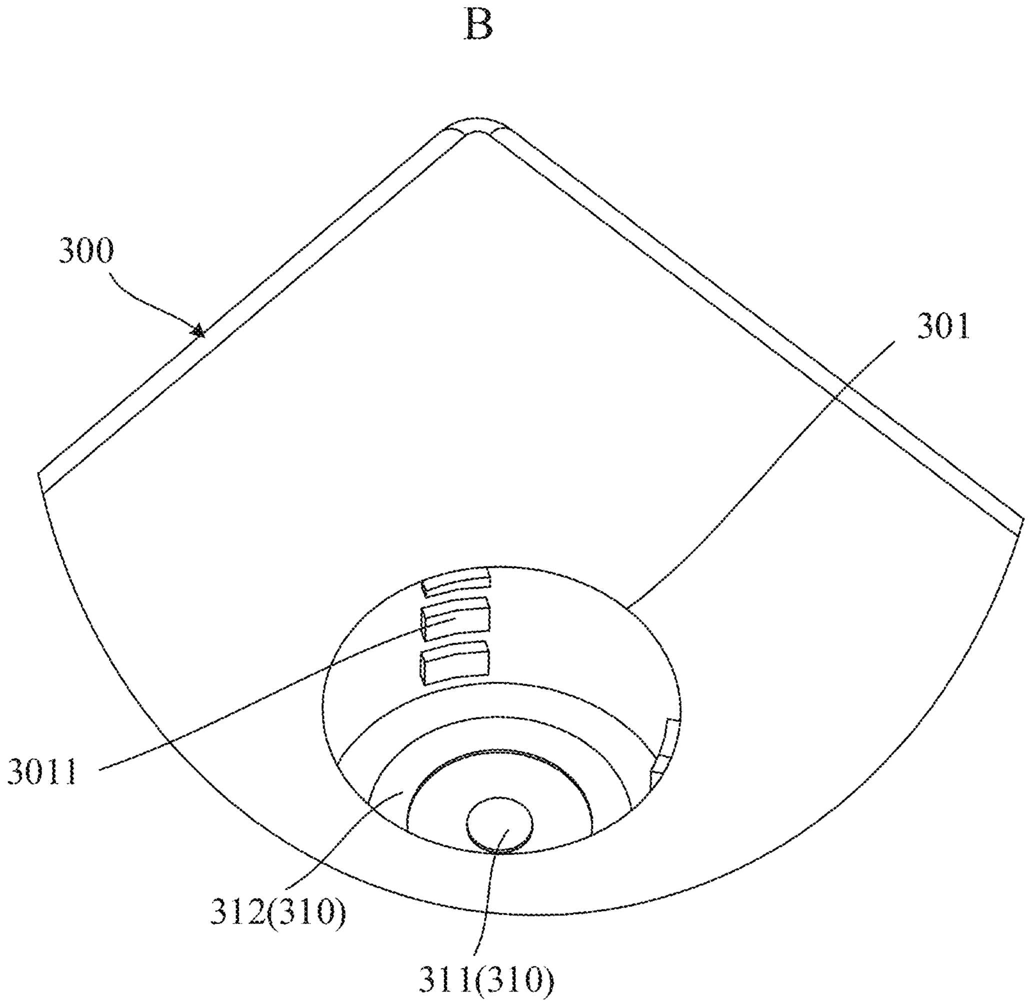
FIG. 5 is an enlarged schematic diagram of a part B in FIG. 4.

In one of the embodiments, referring to FIG. 3 and FIG. 5, an external thread 1101 is formed on a side wall of the mounting part 110; and an internal thread 3011 is formed on an inner wall of the mounting groove 301, and the internal thread 3011 is matched with the external thread 1101, so that the mounting part 110 can be connected to the base 300 in a threaded matching manner. The connecting process of the lamp housing 100 and the base 300 is as follows: the mounting part 110 is in contact with the mounting groove 301, the lamp housing 100 is rotated, the lamp housing 100 drives the mounting part 110 to rotate, and the mounting part 110 and the mounting groove 301 are firmly connected together under the cooperation of the external thread 1101 and the internal thread 3011. When it is necessary to separate the lamp housing 100 from the base 300, it is only necessary to rotate the lamp housing 100 in an opposite direction, and the mounting part 110 will be loosened relative to the mounting groove 301.

In some embodiments, referring to FIG. 2, FIG. 3, FIG. 4 and FIG. 5, the electric contacts 120 are arranged at the bottom of the mounting part 110, the number of the electric contacts 120 is two, and the distances from the two electric contacts 120 to the center of the columnar structure 110*a* are not equal; and the conductive structures 310 include a first conductive sheet 311 and a second conductive sheet 312, the first conductive sheet 311 and the second conductive sheet 312 are located on a bottom wall of the mounting groove 301, and the first conductive sheet 311 and the second conductive sheet 312 are configured to be in contact with different electric contacts 120. The first conductive sheet 311 is a round conductive sheet, the second conductive sheet 312 is an annular conductive sheet and surrounds the first conductive sheet 311, and a gap is formed between the first conductive sheet 311 and the second conductive sheet 312.

In this embodiment, the electric contacts 120 are located at the bottom of the mounting part 110, that is, the electric contacts 120 are exposed from the mounting part 110. Based on this, the number of the electric contacts 120 is two, the two electric contacts 120 are respectively configured to be in contact with the first conductive sheet 311 and the second conductive sheet 312. In this way, compared with the manner of arranging only one electric contact 120, it is beneficial to reduce the impedance, so that the energy consumption of the decorative tree lamp 10 can be reduced.

In addition, the distances from the two electric contacts 120 to the center of the columnar structure 110*a* are not equal, where the electric contact 120 with a small distance to the center of the columnar structure 110*a* is configured to be in contact with the first conductive sheet 311, and the electric contact 120 with a large distance to the center of the columnar structure 110*a* is configured to be in contact with the second conductive sheet 312. Since the first conductive sheet 311 and the second conductive sheet 312 are respectively a round conductive sheet and an annular conductive sheet, during the rotation of the mounting part 110 relative to the mounting groove 301, the electric contacts 120 and the corresponding conductive sheets still can face up and down without being staggered. In this way, the contact relationship between the electric contacts 120 and the corresponding conductive sheets will not be affected by the rotation angle of the mounting part 110.

Further, one of the two electric contacts 120 may be located at the center of the columnar structure 110*a*, and the other one of the two electric contacts 120 may deviate from the center of the columnar structure 110*a*. Or the two electric contacts 120 may deviate from the center of the columnar structure 110*a*. If one of the electric contacts 120 is located at the center of the columnar structure 110*a*, the area of the first conductive sheet 311 may be set relatively small; and if the two electric contacts 120 deviate from the center of the columnar structure 110*a*, the area of the first conductive sheet 311 is required to be set relatively large, so that in a horizontal direction, the area of the first conductive sheet 311 may cover the position of one of the electric contacts 120.

In some embodiments, as shown in FIG. 8 to FIG. 15, the mounting part 110 is of a sleeve structure 110*b*, an inserting-connection column 3014 is arranged in the mounting groove 301, and the sleeve structure 110*b* can be inserted into the mounting groove 301 and sleeved on the inserting-connection column 3014. In this embodiment, the mounting part 110 and the base 300 are connected in an inserting connection manner. Specifically, the sleeve structure 110*b* can be inserted into the mounting groove 301 and sleeved on the inserting-connection column 3014, and at this time, the connection between the mounting part 110 and the base 300 is completed. Compared with the rotary connection manner of the mounting part 110, the inserting connection manner is simpler in operation, thereby improving the assembling or disassembling efficiency of the lamp housing 100 and the base 300.

Figure 9:
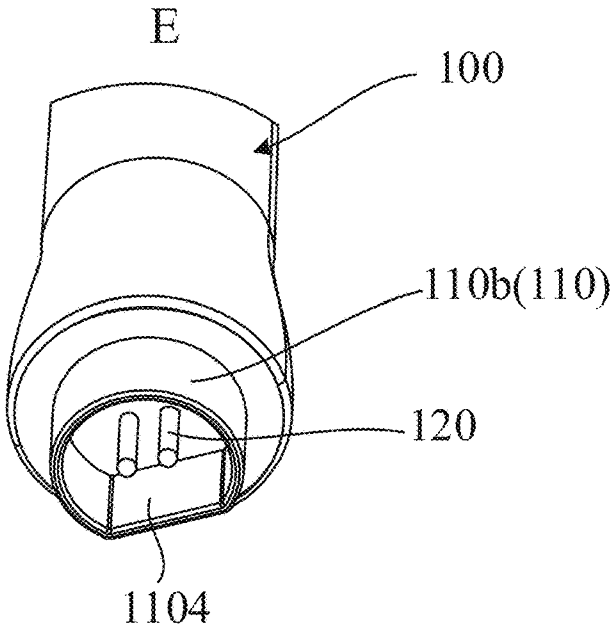
FIG. 9 is an enlarged schematic diagram of a part E in FIG. 8.
Figure 10:
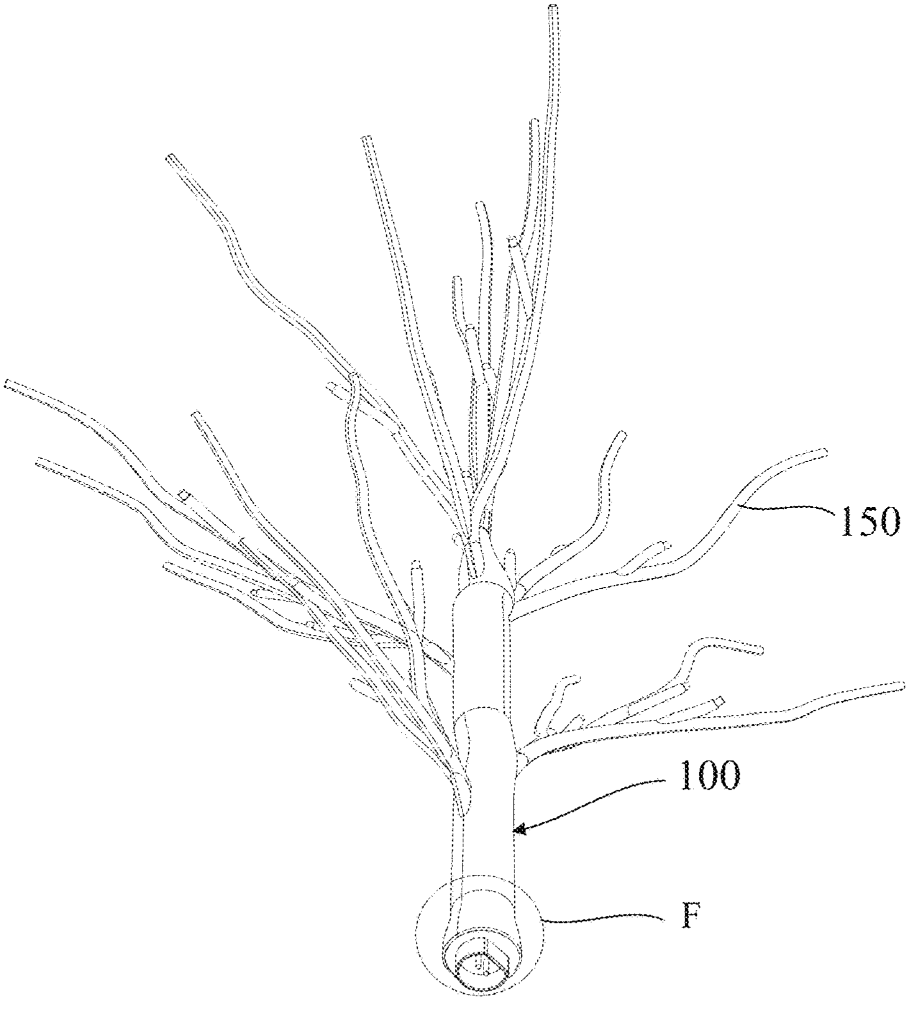
FIG. 10 is a structural schematic diagram of the lamp housing shown in FIG. 8 in another perspective.
Figure 11:
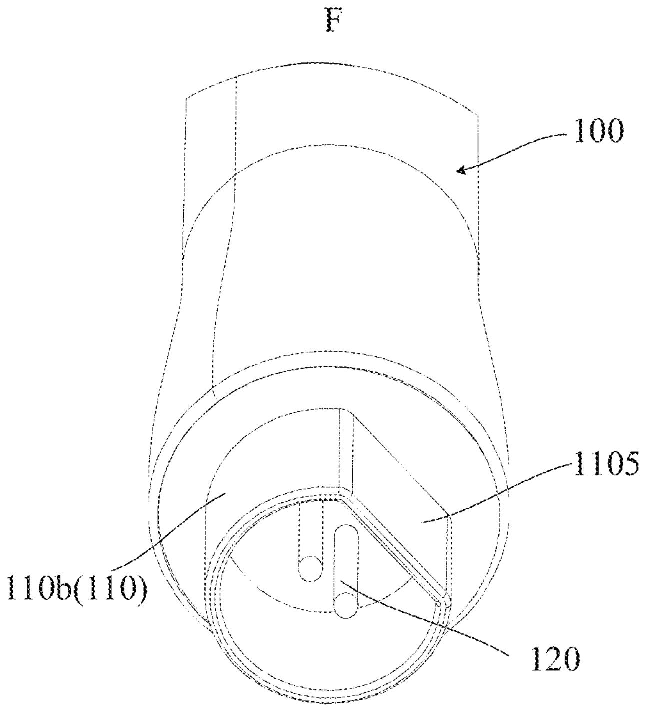
FIG. 11 is an enlarged schematic diagram of a part F in FIG. 10.
Figure 12:
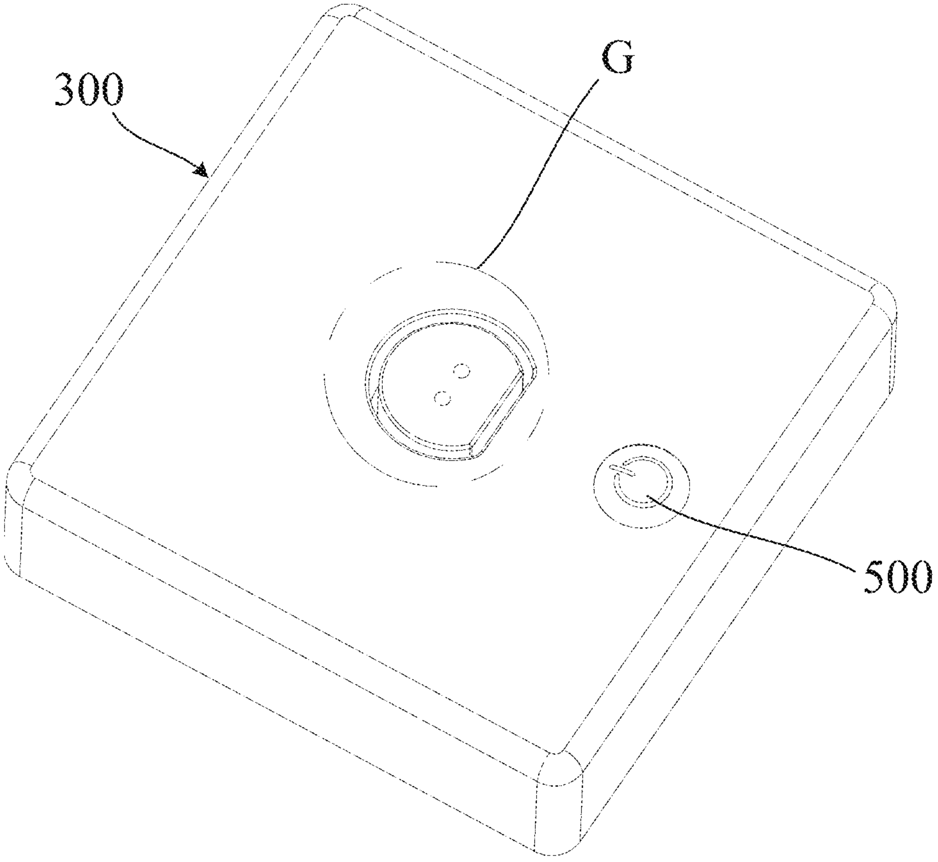
FIG. 12 is a structural schematic diagram of a base according to another embodiment of the present application.
Figure 13:
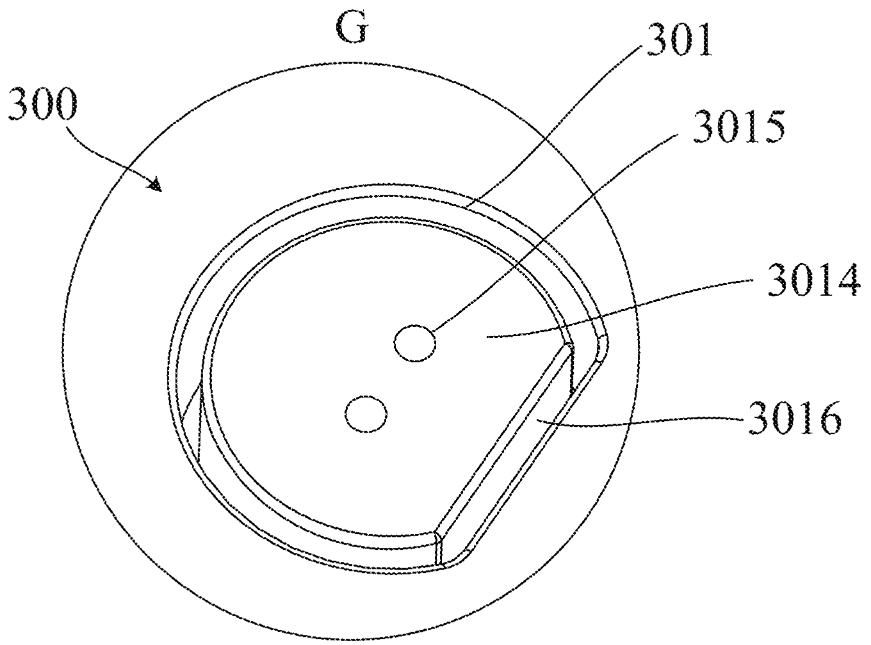
FIG. 13 is an enlarged schematic diagram of a part G in FIG. 12.
Figure 14:
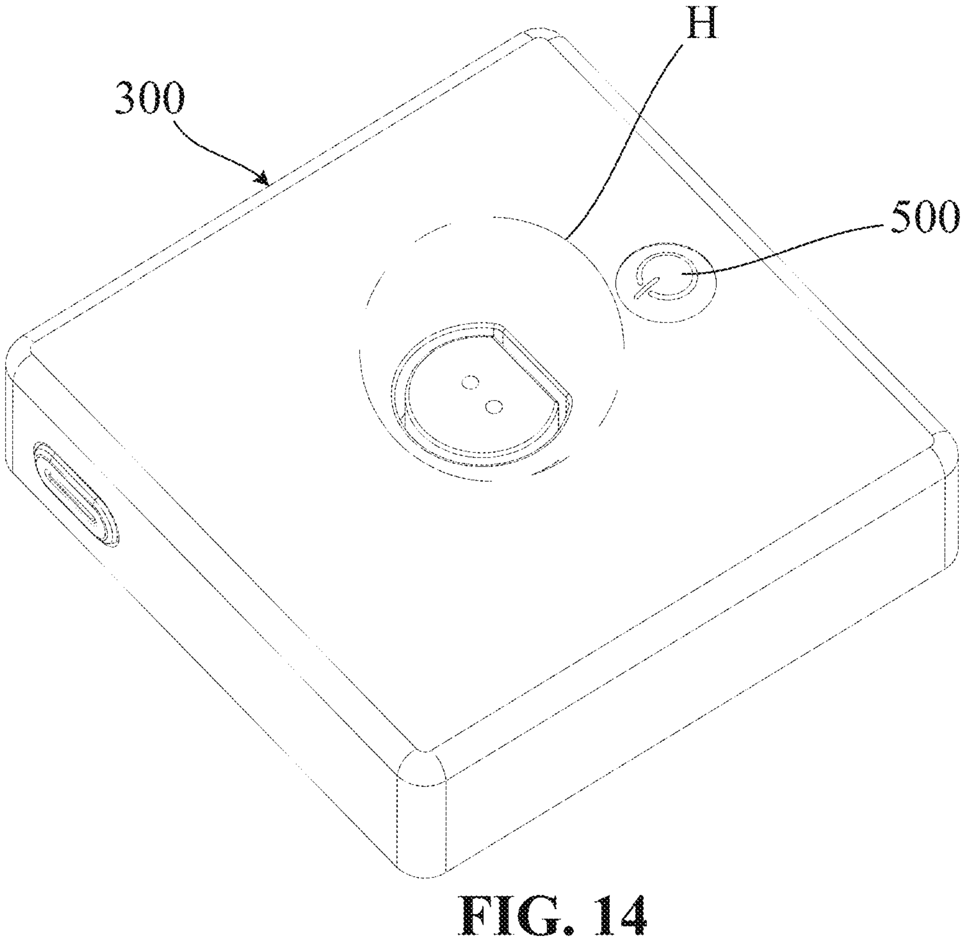
FIG. 14 is a structural schematic diagram of the base shown in FIG. 12 in another perspective.
Figure 15:
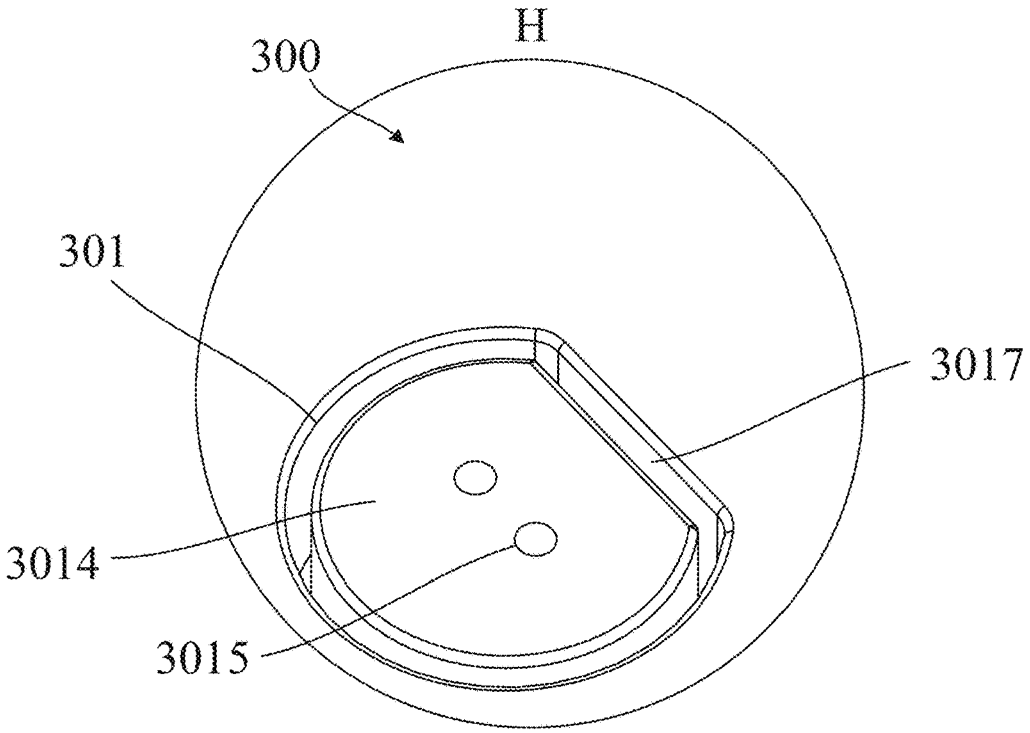
FIG. 15 is an enlarged schematic diagram of a part H in FIG. 14.

Further, referring to FIG. 9 and FIG. 13, the electric contacts 120 are arranged inside the sleeve structure 110*b*, the inserting-connection column 3014 is of a hollow structure, the conductive structures 310 are located inside the inserting-connection column 3014, through holes 3015 are formed in an upper surface of the inserting-connection column 3014, and the electric contacts 120 can be inserted into the through holes 3015 and be in contact with the conductive structures 310. In this way, in a case that the mounting part 110 is mounted at the mounting groove 301, the electric contacts 120 can be in contact with the conductive structures 310, so that the electric conduction between the power supply unit 400 and the light-emitting body 200 can be realized.

Figure 16:
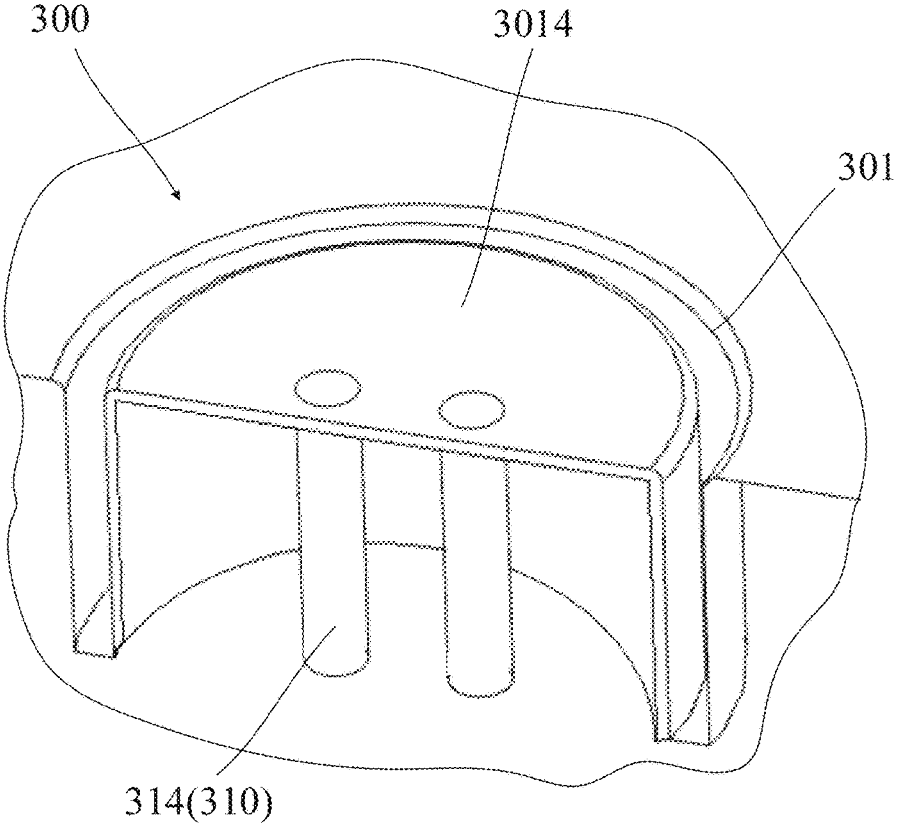
FIG. 16 is a schematic diagram of an internal structure of an inserting-connection column according to an embodiment of the present application.

Specifically, as shown in FIG. 16, the conductive structures 310 may be cylindrical structures 314, upper ends of the cylindrical structures 314 are connected to a top wall of the inserting-connection column 3014, and the electric contacts 120 can extend into the cylindrical structures 314 and be in contact with the cylindrical structures 314. The cylindrical structures 314 may be made of conductive materials (such as metal materials). In a case that the electric contacts 120 are inserted into the through holes 3015, parts of the electric contacts 120 extending into the inserting-connection column 3014 will enter the cylindrical structures 314 and be in contact with the inner walls of the cylindrical structures 314. This contact mode can make the electric contacts 120 and the conductive structures 310 have a relatively large area, thereby ensuring the stability of electric conductors between the electric contacts and the conductive structures.

In one of the embodiments, referring to FIG. 9, FIG. 13 and FIG. 16, the number of the electric contacts 120 is two, the number of the conductive structures 310 is two, the number of the through holes 3015 is two, and the two electric contacts 120 respectively can be inserted into the corresponding through holes 3015 and be in contact with the corresponding conductive structures 310. In this embodiment, the number of the electric contacts 120 is two, and the two electric contacts 120 are respectively configured to be in contact with the corresponding conductive structures 310. In this way, compared with the manner of arranging only one electric contact 120, it is beneficial to reduce the impedance, so that the energy consumption of the decorative tree lamp 10 can be reduced.

In one of the embodiments, referring to FIG. 8, FIG. 9, FIG. 12 and FIG. 13, an inner wall surface of the sleeve structure 110*b* includes at least one first plane part 1104, an outer wall surface of the inserting-connection column 3014 includes at least one second plane part 3016, the number of second plane parts 3016 is equal to that of first plane parts 1104, and the second plane part 3016 is configured to be in contact with the first plane part 1104 so as to limit the rotation of the sleeve structure 110*b* relative to the inserting-connection column 3014. In this embodiment, in a case that the first plane part 1104 and the second plane part 3016 are attached to each other, the two electric contacts 120 may be just aligned with the two through holes 3015; furthermore, through the counteraction of the first plane part 1104 and the second plane part 3016, the rotation of the sleeve structure 110*b* relative to the inserting-connection column 3014 can be limited. In this way, on one hand, when the sleeve structure 110*b* is sleeved at the inserting-connection column 3014, it is beneficial to rapidly find the angle that makes the electric contacts 120 be aligned with the through holes 3015; and on the other hand, after the sleeve structure 110*b* is connected to the inserting-connection column 3014, damage to the electric contacts 120 caused by the rotation of the sleeve structure 110*b* relative to the inserting-connection column 3014 can be avoided.

In one of the embodiments, referring to FIG. 10, FIG. 11, FIG. 14 and FIG. 15, an outer wall surface of the sleeve structure 110*b* includes at least one third plane part 1105, an inner wall surface of the mounting groove 301 includes at least one fourth plane part 3017, the number of fourth plane parts 3017 is equal to that of third plane parts 1105, and the fourth plane part 3017 is configured to be in contact with the third plane part 1105 so as to limit the rotation of the sleeve structure 110*b* relative to the mounting groove 301. In this embodiment, in a case that the third plane part 1105 and the fourth plane part 3017 are attached to each other, the two electric contacts 120 may be just aligned with the two through holes 3015; furthermore, through the counteraction of the third plane part 1105 and the fourth plane part 3017, the rotation of the sleeve structure 110*b* relative to the mounting groove 301 can be limited. In this way, on one hand, when the sleeve structure 110*b* is inserted into the mounting groove 301, it is beneficial to rapidly find the angle that makes the electric contacts 120 be aligned with the through holes 3015; and on the other hand, after the sleeve structure 110*b* is inserted into the mounting groove 301, damage to the electric contacts 120 caused by the rotation of the sleeve structure 110*b* relative to the mounting groove 301 can be avoided.

Figure 6:
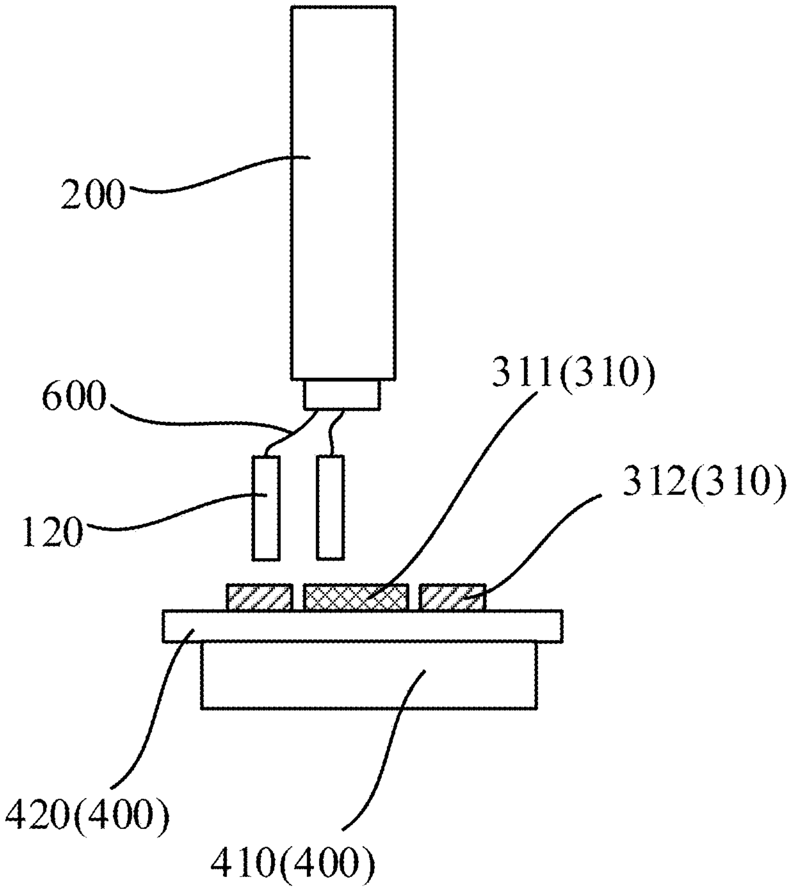
FIG. 6 is a schematic diagram of an internal structure of a decorative tree lamp according to an embodiment of the present application.

In some embodiments, referring to FIG. 6, the power supply unit 400 includes a battery 410 and a circuit board 420, and the conductive structures 310 and the battery 410 are electrically connected to the circuit board 420. A circuit is arranged on the circuit board 420, and the battery 410 and the conductive structures 310 are connected to the circuit, so that the battery 410 can supply power to the light-emitting body 200.

Figure 4:
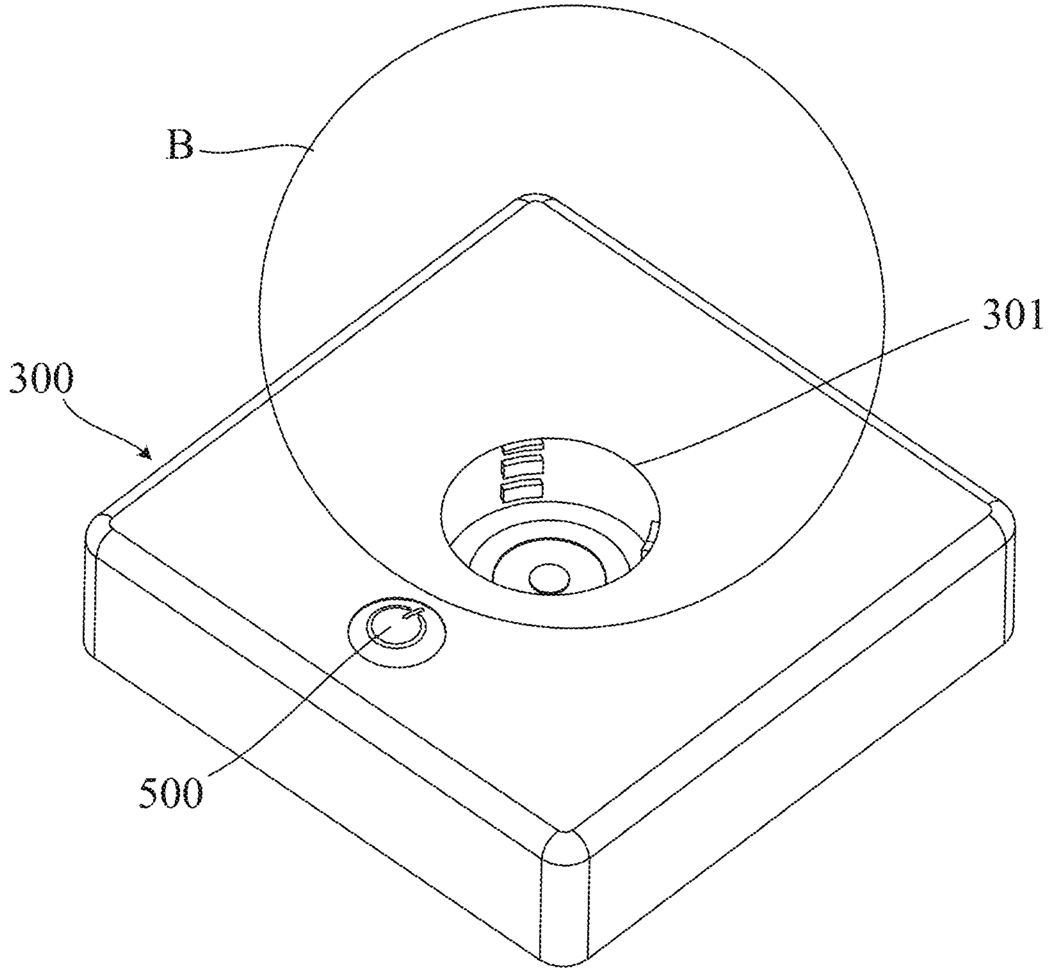
FIG. 4 is a structural schematic diagram of a base according to an embodiment of the present application.

In some embodiments, referring to FIG. 4, the decorative tree lamp 10 further includes a control switch 500, the control switch 500 is electrically connected to the circuit board 420, and the control switch 500 is connected to a circuit where the conductive structures 310 and the battery 410 are located so as to control the on or off of the circuit. Therefore, the light-emitting body 200 can be controlled by the control switch 500 to turn on or off.

Figure 17:
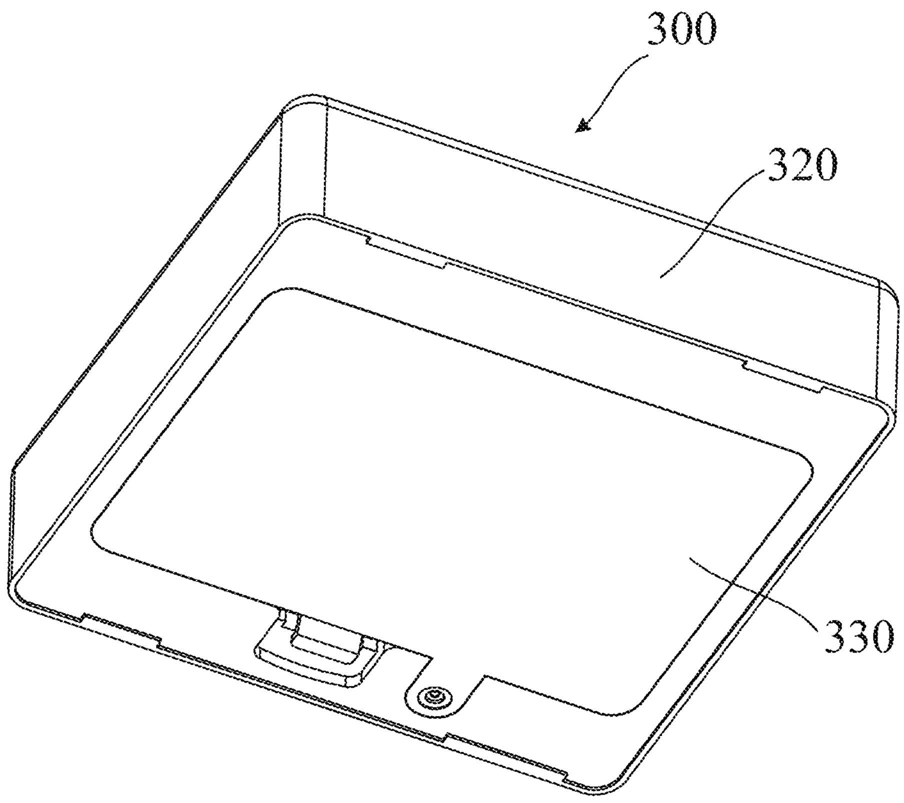
FIG. 17 is a schematic diagram of a bottom structure of a base according to an embodiment of the present application.

In some embodiments, as shown in FIG. 17, the base 300 includes an upper housing 320 and a lower cover plate 330, the lower cover plate 330 is connected to the upper shell 320 in a detachable manner, the upper housing 320 and the lower cover plate 330 jointly define a mounting cavity, and the power supply unit 400 is located in the mounting cavity. Specifically, the lower cover plate 330 may be connected to the upper housing through screw connection and snap connection. In this way, the lower cover plate 330 can be disassembled from the upper housing 320, thereby facilitating the maintenance or replacement of the power supply unit 400.

The above merely describes specific embodiments of the present application, but the protection scope of the present application is not limited thereto. Any person skilled in the art can easily conceive modifications or replacements within the technical scope of the present application, and these modifications or replacements shall fall within the protection scope of the present application. Therefore, the protection scope of the present application should be subject to the protection scope of the claims.

The invention claimed is:

1. A decorative tree lamp, comprising:

a lamp housing, configured to have a tree shape, an accommodating cavity being formed inside the lamp housing, a mounting part being formed at a lower end of the lamp housing, and electric contacts being also arranged at the lower end of the lamp housing;

a light-emitting body, arranged in the accommodating cavity and electrically connected to the electric contacts; and a base, a power supply unit being arranged inside the base, a mounting groove being formed in the top surface of the base, conductive structures being arranged in the mounting groove, and the conductive structures being electrically connected to the power supply unit, wherein the mounting part is mounted at the mounting groove in a detachable manner, and in a case that the mounting part is mounted at the mounting groove, the electric contacts are in contact with the conductive structures;

wherein the mounting part is of a columnar structure, the mounting groove is a round groove, and the mounting part is capable of being connected to the base in a manner of rotating relative to the mounting groove;

wherein the electric contacts are arranged at the bottom of the mounting part, the number of the electric contacts is two, and the distances from the two electric contacts to the center of the columnar structure are not equal;

the conductive structures comprise a first conductive sheet and a second conductive sheet, the first conductive sheet and the second conductive sheet are located on a bottom wall of the mounting groove, and the first conductive sheet and the second conductive sheet are configured to be in contact with different electric contacts; and the first conductive sheet is a disk shaped conductive sheet, the second conductive sheet is an annular conductive sheet and surrounds the first conductive sheet, and a gap is formed between the first conductive sheet and the second conductive sheet;

wherein both of the two electric contacts deviate from the center of the columnar structure, and one of the two electric contacts is closer to the center of the columnar structure than the other; wherein the electric contact closer to the center of the columnar structure is configured to be in contact with the round conductive sheet; and wherein the electric contact farther from the center of the columnar structure is configured to be in contact with the annular conductive sheet.

2. The decorative tree lamp according to claim 1, wherein an external thread is formed on a side wall of the mounting part; and an internal thread is formed on an inner wall of the mounting groove, and the internal thread is matched with the external thread, so that the mounting part is capable of being connected to the base in a threaded matching manner.

3. The decorative tree lamp according to claim 1, wherein the power supply unit comprises a battery and a circuit board, and the conductive structures and the battery are electrically connected to the circuit board.

4. The decorative tree lamp according to claim 3, further comprising a control switch, wherein the control switch is electrically connected to the circuit board, and the control switch is connected to a circuit where the conductive structures and the battery are located so as to control the on or off of the circuit.

5. The decorative tree lamp according to claim 1, wherein the base comprises an upper housing and a lower cover plate, the lower cover plate is connected to the upper housing in a detachable manner, the upper housing and the lower cover plate jointly define a mounting cavity, and the power supply unit is located in the mounting cavity.

* * * * *